FIG-1-

Feb. 5, 1963 M. H. GROVE 3,076,631
VALVE CONSTRUCTION WITH HOLLOW RESILIENT SEALING MEANS
Filed July 18, 1960 8 Sheets-Sheet 3

INVENTOR.
MARVIN H. GROVE
BY

Feb. 5, 1963

M. H. GROVE 3,076,631

VALVE CONSTRUCTION WITH HOLLOW RESILIENT SEALING MEANS

Filed July 18, 1960

INVENTOR.
MARVIN H. GROVE
BY

FIG_7_

Feb. 5, 1963  M. H. GROVE  3,076,631
VALVE CONSTRUCTION WITH HOLLOW RESILIENT SEALING MEANS
Filed July 18, 1960  8 Sheets-Sheet 6

FIG-8-

INVENTOR.
MARVIN H. GROVE

Feb. 5, 1963 M. H. GROVE 3,076,631
VALVE CONSTRUCTION WITH HOLLOW RESILIENT SEALING MEANS
Filed July 18, 1960 8 Sheets-Sheet 8

FIG_12_

FIG_13_

INVENTOR.
MARVIN H. GROVE
BY

United States Patent Office 3,076,631
Patented Feb. 5, 1963

3,076,631
VALVE CONSTRUCTION WITH HOLLOW
RESILIENT SEALING MEANS
Marvin Henry Grove, 340 Hillside Ave., Piedmont, Calif.
Filed July 18, 1960, Ser. No. 43,396
9 Claims. (Cl. 251—173)

This invention relates generally to valves for controlling fluid flow, and to sealing means used in such valves.

In recent years a number of successful valves have been marketed which use sealing means formed of resilient material, such as synthetic rubber, Teflon, Kel F, nylon, and the like. For example, one commercial valve which has been particularly successful uses sealing means of the resilient O-ring type. The O-ring is accommodated within a recess formed in one of the valve members, and is disposed to be brought into fluid tight sealing contact with the other valve member for closed position of the valve. In many instances it is desirable to provide a valve sealing means which will provide a relatively great latitude of accommodation. Particularly I have reference to accommodation with respect to machining methods, clearances and alignment during assembly. In general it is expensive to provide lapped or similar smooth metal surfaces, such as are required in many valve designs. Also it is expensive to maintain close clearances, and accurate alignment in assembly. In addition to the foregoing, many valve designs making use of sealing rings of the resilient O-ring type, require relatively expensive mounting means for the O-rings which contributes to the overall cost. Here again there is need for sealing means which is capable of utilizing relatively simple mounting means, and which facilitates economical manufacture. Aside from the foregoing, prior valve seals of the resilient O-ring type are not as adaptable as desired for use with various synthetic materials, some of which have limited resiliency.

In general it is an object of the present invention to provide a valve construction having novel sealing means with many advantages over the resilient sealing means previously employed.

Another object of the invention is to provide a valve of the above character having resilient sealing means which affords a relatively high degree of accommodation with respect to machining methods, clearances between the valve parts and alignment during assembly.

Another object is to provide a valve having sealing means which can be made of a wide variety of materials.

Another object is to provide a valve construction of the above character which can be manufactured at low cost.

A further object is to provide a new resilient seal ring which can be adapted for a wide variety of valves and pressure ratings.

Referring to the drawing.

Figure 1:
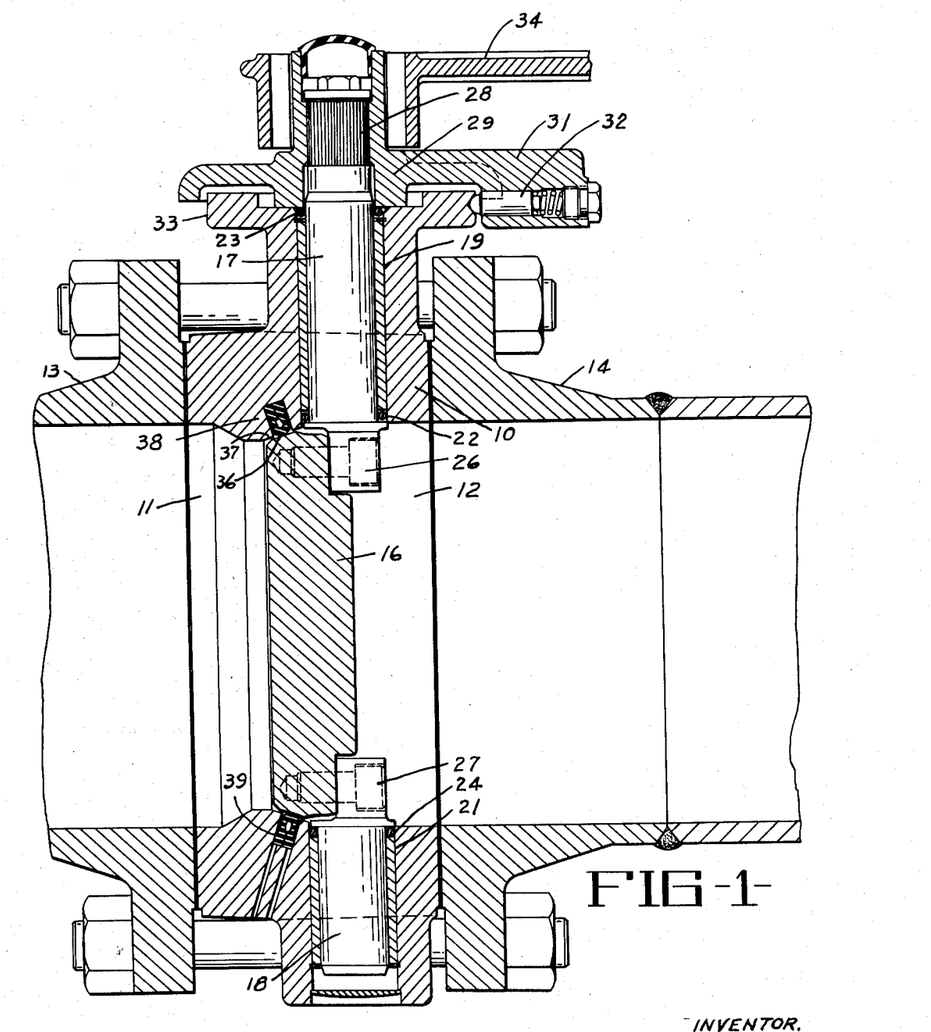
FIGURE 1 is a side elevational view in section illustrating a valve of the butterfly type utilizing the present invention.

The butterfly type of valve illustrated in FIGURE 1 consists of a body 10 provided with aligned flow passages 11 and 12 that are adapted for making connection with the coupling flanges 13 and 14 of associated piping. Within the body there is a disk-like valve member 16, which is attached at diametrically opposite regions to the inner ends of the shafts 17 and 18. The shafts are shown journalled within the body bushings 19 and 21. Suitable means such as the seal rings 22 and 23 of the resilient O-ring type, prevent leakage between the shaft 17 and the body. The shaft 18 is similarly sealed with respect to the body of the resilient O-ring 24. Suitable means such as the screws 26 and 27 serve to fix the inner ends of the shafts to the margins of the disk 16.

Exterior of the body, projecting end 28 of the shaft 17 is shown fixed to the hub 29 of the arm 31. This arm is provided with a spring pressed detent 32, which engages in angularly spaced depressions in the body flange 33. A handle 34 is shown being applied over the hub 29 for turning the valve member between open and closed positions.

The valve member 16 is provided with a machined valve working surface 36 that is disposed generally in a plane offset from the axis of rotation of the shafts 17 and 18. This surface 36 may be machined as a portion of a spherical surface having its center coincident with the axis of the shafts 17 and 18 and the axis of the passages 11 and 12, as indicated in FIGURE 1. Instead of employing a spherical valve working surface, this surface may be substantially spherical (e.g. conical), whereby in section it appears as a straight line tangent to the spherical surface which it approximates. The body is machined to provide a complementary surface 37, which at all times is spaced from the valve working surface 36 by a predetermined clearance. Thus the valve member can be rotated between open and closed positions without rubbing contact between the metal surfaces 36 and 37.

Figures 2, 3, 9:
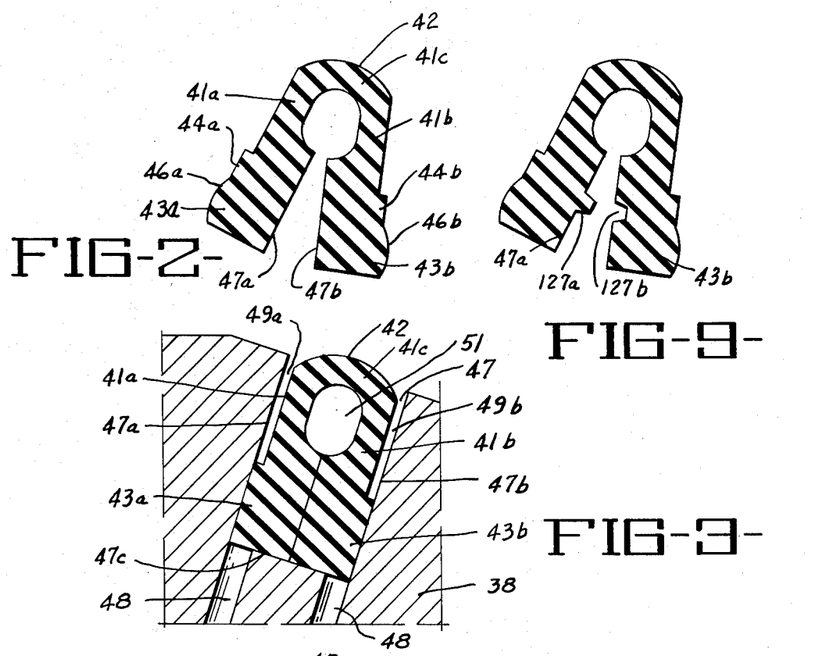
FIGURE 2 is an enlrged detail in section showing the construction of the resilient seal ring.
FIGURE 3 is an enlarged detail in section showing the seal ring position within its retaining recess.
FIGURE 9 is a cross-sectional view like FIGURE 2, but illustrating another embodiment.
Figure 4:
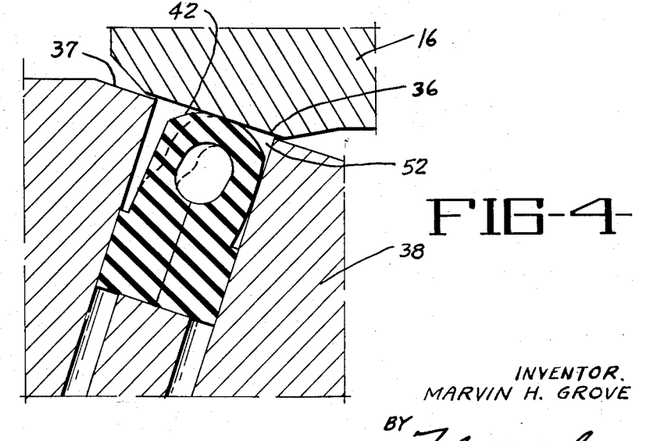
FIGURE 4 is a view like FIGURE 3 but showing the manner in which the seal ring makes engagement with the cooperating valve member, and is distorted by application of fluid pressure differential.

The annular portion 38 of the body upon which the surface 37 is formed provides in effect a mounting means for the sealing means 39. One form of the sealing means is shown in FIGURES 2–4. In its preferred form it consists of connected flexible wall portions, including the side wall portions 41a and 41b, and the connecting end wall portion 41c, which presents an exterior curved surface 42. The edges of the flexible wall portions 41a and 41b are provided with integral thickened edge portions 43a and 43b, which perform certain sealing and holding functions as will be presently described. It will be noted that the thickened portions 43a and 43b provide the shoulders 44a, 44b, and that the exterior faces of these thickened portions are also provided with bulged portions 46a, 46b. The opposed faces 47a, 47b, can either be flat as illustrated, or formed with corrugations or the like, whereby when these surfaces are compressed together, a fluid tight seal is formed.

FIGURES 3 and 4 illustrate the simple mounting means for the seal ring of FIGURE 2. Note that the thickened portions 43a, 43b, are compressed together and held under compression between the substantially parallel side surfaces 47a, 47b, of the body recess 47. Also these thickened portions seat upon the bottom defining surface 47c of the recess. The bulged surfaces 46a, 46b, do not appear as such in FIGURE 3 because of the applied compression. When disposed within the annular recess 47 in the manner shown in FIGURE 3, the thickened portions 43a, 43b, are pressed in fluid tight sealing contact with each other and with the side recess surfaces 47a, 47b, whereby the interior of the valve is sealed with respect to the bottom of the recess. When installed in this manner the two portions 43a, 43b, may be said to form a base portion for the ring. One or more pressure equalizing ducts or vents 48 connect between the bottom corners of the recess 47, adjacent the bottom defining surface 47c, and the atmosphere. Thus line pressure applied to the seal tends at all times to urge it against the bottom surface 47c, whereby it cannot be dislodged during operation of the valve.

When the seal is in the relaxed position shown in FIGURE 3, spaces 49a and 49b exist between the exterior side surfaces of the wall portions 41a and 41b and the adjacent recess defining surfaces 47a and 47b.

The seal ring described above is molded in one integral piece, preferably from suitable synthetic rubber or other resilient material. For example, I can use such materials as Hycar, neoprene, Teflon, Kel F, or nylon. It should have sufficient strength and wear resisting properties to provide a long useful life when incorporated in various valve structures. The resiliency of the material should be sufficient to permit flexing of the wall portions 41a, 41b and 41c.

At the time the seal ring is incorporated in a valve, the inner space 51, which becomes a sealed space during assembly, may be filled with a substantially incompressible material capable of acting like hydraulic fluid with respect to its pressure transmitting characteristics. For example the seal ring can be assembled in the valve while under water, thus causing the space 51 to be filled with water. Instead of water, other liquids can be used, such as glycerin, glycol and the like. In place of freely flowable liquids, I may use semi-liquids, such as fluid or semi-fluid latex solutions or emulsions. Another material which can be employed, is a self supporting core of natural or synthetic rubber or elastomer which is relatively soft and resilient, and which can be a molded ring or strip, dimensioned in accordance with the dimensions of the space 51 in FIGURE 3. Such a strip or ring is laid into the space 51 immediately before assembly, and then snugly fills the interior of the space 51 after assembly.

The seal ring should be dimensioned whereby after installation in a valve assembly its exterior surface 42 contacts and establishes an initial seal with respect to the valve working surface 36 of the movable valve member. In other words the dimensioning of the seal is such that when the valve member is moved in closed position, some small amount of deformation occurs which is accommodated by bending of the wall portions 41a, 41b and 41c, and resiliency of these wall portions serving to urge the surface 42 against the valve working surface 36.

Operation of the invention described above is as follows: Assuming that the valve disk is turned to closed position, the valve working surface 36 is brought into sealing contact with the surface 42 of the seal ring in the manner illustrated in FIGURES 1 and 4. Because of some distortion of the walls 41a, 41b and 41c, the contact pressure is sufficient to establish an initial seal. When a fluid pressure differential is applied to the valve, the seal ring is pressed and distorted toward one side or the other of the recess 42, as shown in FIGURE 4. In this instance it is assumed that a fluid pressure differential is applied to the left hand side of the seal with the result that the flexible wall portions of the seal have been displaced somewhat toward the right. Thus the wall portion 41b is shown pressed against the supporting recess surface 47b, and the wall portion 41c has been distorted somewhat and forced into the recess corner 52. Higher applied fluid pressure differential further flattens the wall portion 41b against the supporting recess surface 47b, and further squeezes the wall portion 41c into the corner 52. Under high pressure differentials the upstream wall portion 41a may collapse toward the downstream wall portion 41b as shown for example in dotted lines in FIGURE 4. Irrespective of the extent which the seal ring is collapsed, the portion 41c is always urged by fluid pressure into sealing engagement with the cooperating valve working surface 36 of the valve member. Assuming that the line pressure is reversed, it will be evident that the operation is the same as described above. In other words, the flexible wall portions of the seal are deflected to the left instead of to the right and the wall portion 41a is brought into contact and supported by the recess surface 47a. It will be noted in connection with the operation just described that both the flexible wall portions 41a and 41b are exposed to fluid pressure differential applied to their corresponding sides of the valve. The provision of the spaces 41a and 41b for normal relaxed position of the seal ring, insures such exposure to fluid pressure. Also this space facilitates insertion of the seal ring during assembly.

The hollow construction of the seal ring is a desirable feature which contributes to obtaining the desired results. It permits the use of material which may be relatively hard and stiff, because the accommodating action of the seal ring and its proper sealing engagement with the valve working surface 36 is dependent upon the flexing of the wall portions, rather than upon compression or expansion of a solid mass. Thus it is feasible to use durable materials such as Teflon or nylon, as well as the more resilient synthetic materials, such as synthetic rubber.

As previously stated in some instances it is desirable to introduce a fluid or semifluid material into the space 51. In such event a fluid pressure transmitting medium occupies the space 51. With such a fluid medium deflection of a side wall portion under applied pressure differential causes pressure to be transmitted substantially uniformly throughout the space 51, and against the inner surfaces of the wall portions 41b and 41c. Under such circumstances the compressed inner fluid resists the collapsing action previously described.

In the valve just described, a clearance is maintained between the valve working surface 36, and the surfaces 37 on the body. The wall portions of the seal ring are dimensioned to be many times thicker than such clearance. This serves to prevent any pinching or extrusion between the surfaces 36 and 37, for all operating conditions.

As previously stated, the vents or ducts 48 lead to the atmosphere and therefore the exterior periphery of the thickened portions 43a and 43b, are exposed to atmospheric pressure. It will be evident from an inspection of FIGURE 4 that when a fluid pressure differential is applied to the valve, pressure is applied against the base of the seal formed by the thickened portions 43a and 43b, to urge the seal against the bottom recess surface 47c. This effect is utilized in the present invention to retain the seal ring within its accommodating recess without the use of special clamping or holding devices.

The particular butterfly type of valve described above makes use of a closure valve member or disk disposed in a plane offset from the axis of rotation. It will be evident that the invention can be applied to other types of butterfly valves, as for example, valves in which the valve member or disk is in a plane coincident with the axis of rotation, or in plane tilted to the axis of rotation.

Figures 5, 5A:
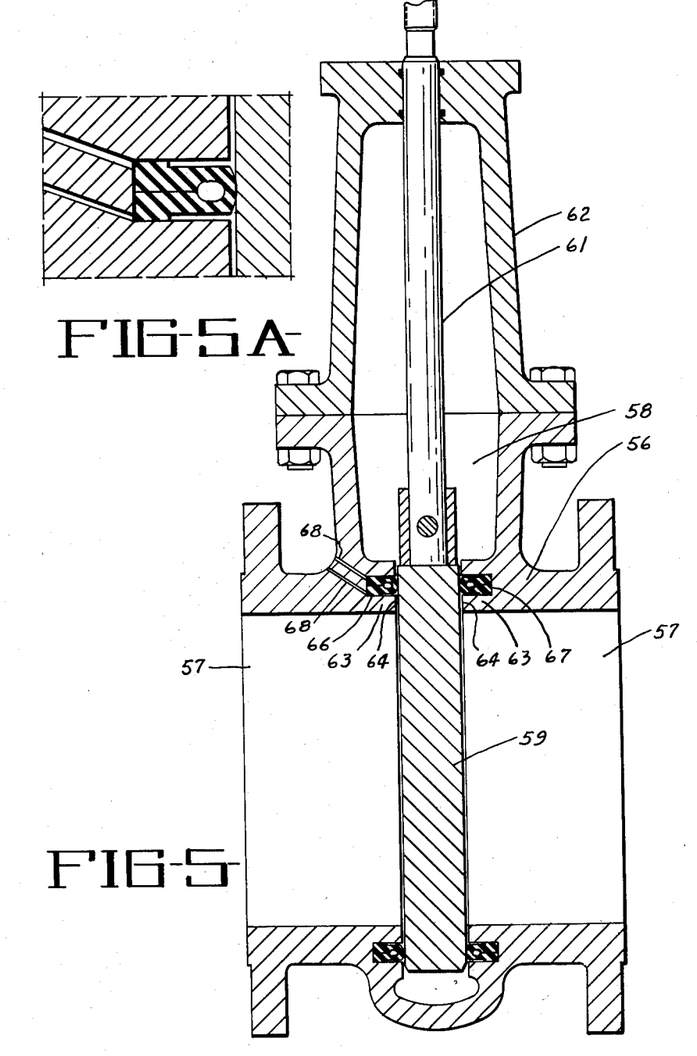
FIGURE 5 is a side elevational view in section illustrating a valve of the gate type utilizing the present invention.
FIGURE 5A is a detail in section, on an enlarged scale, showing the seal ring incorporated in FIGURE 5.

As shown in FIGURE 5, the invention can be incorporated in a valve of the gate type. The valve body 56 in this instance has the aligned flow passages 57 and a body space 58 serving to accommodate the valve gate 59. The gate in this instance is in the form of a flat plate or slab, although it may be a gate of the wedge or tapered type. In accordance with conventional valve construction, the gate is connected to an operating stem 61 that extends through the bonnet 62. The opposed annular portions 63 of the body are machined to provide the flat opposed faces 64 and to provide the annular recesses 66. These recesses serve to accommodate the seal rings 67, formed in the same manner as previously described, except that these rings are molded to the form illustrated in FIGURE 5A. As in many conventional valves, the body preferably is provided with guide ways (not shown) engaging the side edges of the gate 59, whereby normally the gate is retained out of direct contact with the surfaces 64 for closed position and during movement from closed to open positions. Ducts 68 corresponding to the ducts 48 of FIGURES 1 and 3, connect the bottom corners of the recesses 66 with the atmosphere.

The sealing means for the valve of FIGURE 5 operates in substantially the same manner as the valve of FIGURE 1. A seal is established for both the upstream and downstream sides of the gate 59, and during operation of the gate the seal rings are held against dislodgement by virtue of the fact that the fluid pressure differential tends to hold them within the recesses.

Figure 6:
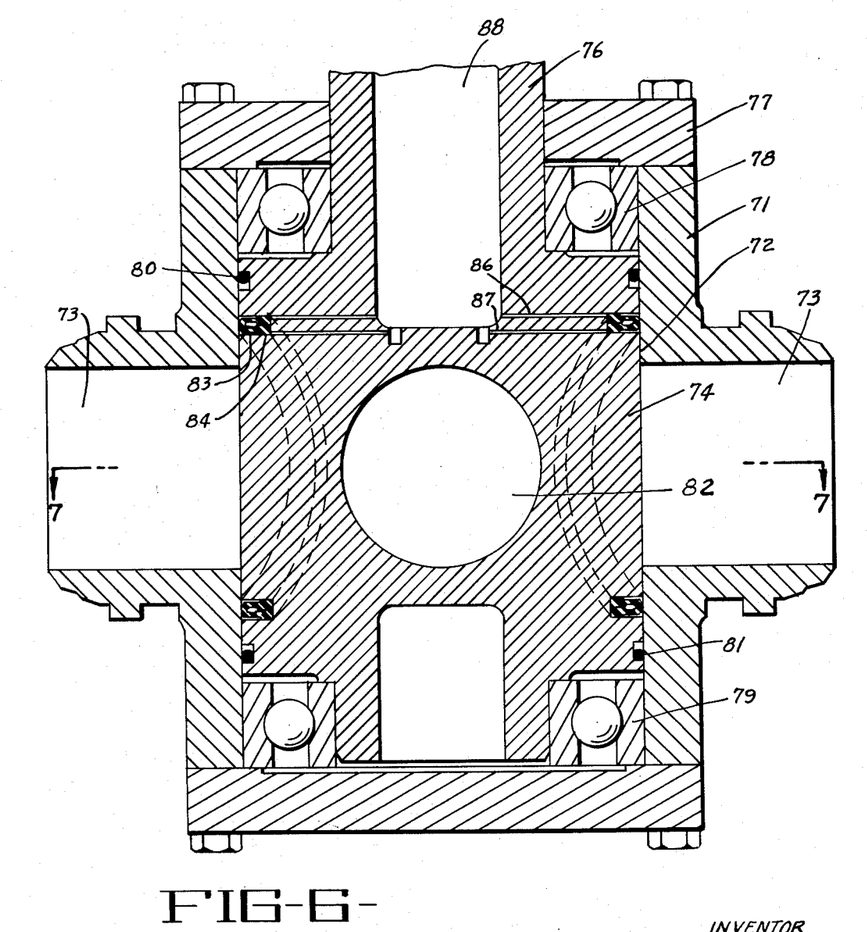
FIGURE 6 is a side elevational view in section illustrating a valve of the cylindrical plug type utilizing the present invention.
Figure 7:
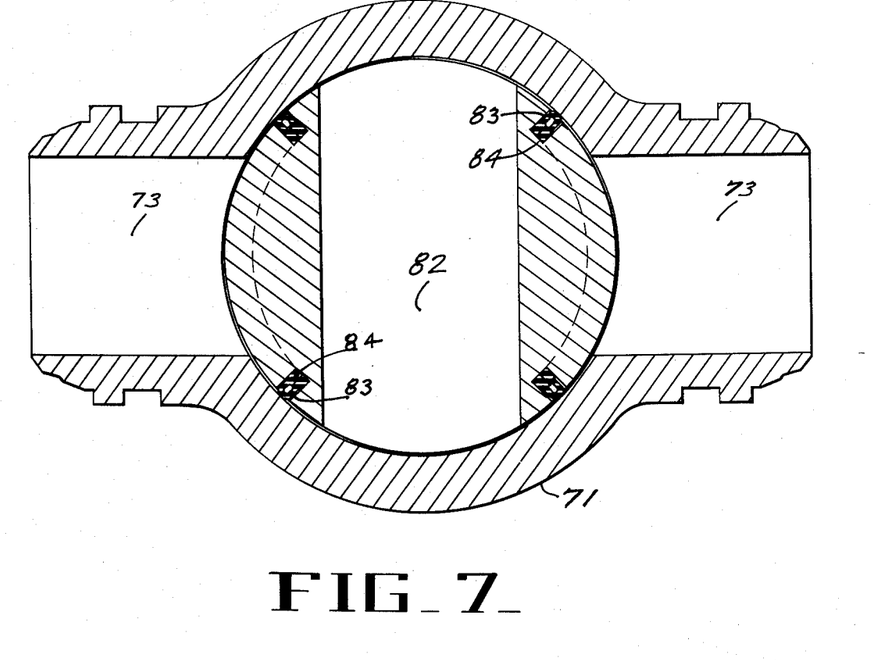
FIGURE 7 is a cross-sectional view taken along the line 7—7 of FIGURE 6.

FIGURE 6 shows my invention incorporated in a valve of the cylindrical plug type. In this instance a body 71 is provided with a cylindrical bore 72 and the flow passages 73. A cylindrical valve plug 74 is fitted within the bore 72 and is provided with an operating stem 76, which extends through the bonnet plate 77. End portions of the plug are journalled by the ball bearing assemblies 78 and 79. Leakage of line fluid past the ends of the plug is prevented by suitable seal means, such as the seals 80 and 81 of the resilient O-ring type. The valve plug is provided with a transverse port 82 which registers with the passages 73 for open position. The two opposite sides of the valve are machined to provide the recesses 83, which accommodate the resilient seal rings 84 of the same type as previously described. Ducts 86 and 87 correspond to the ducts 48 of FIGURE 3, and communicate with the atmosphere through the stem passage 88. Thus line fluid urges the seal rings into their accommodating recesses. For ease of assembly, the resilient seal rings utilized in the plug valve of FIGURES 6 and 7, may be molded to conform generally to their configuration after installation.

Figure 8:
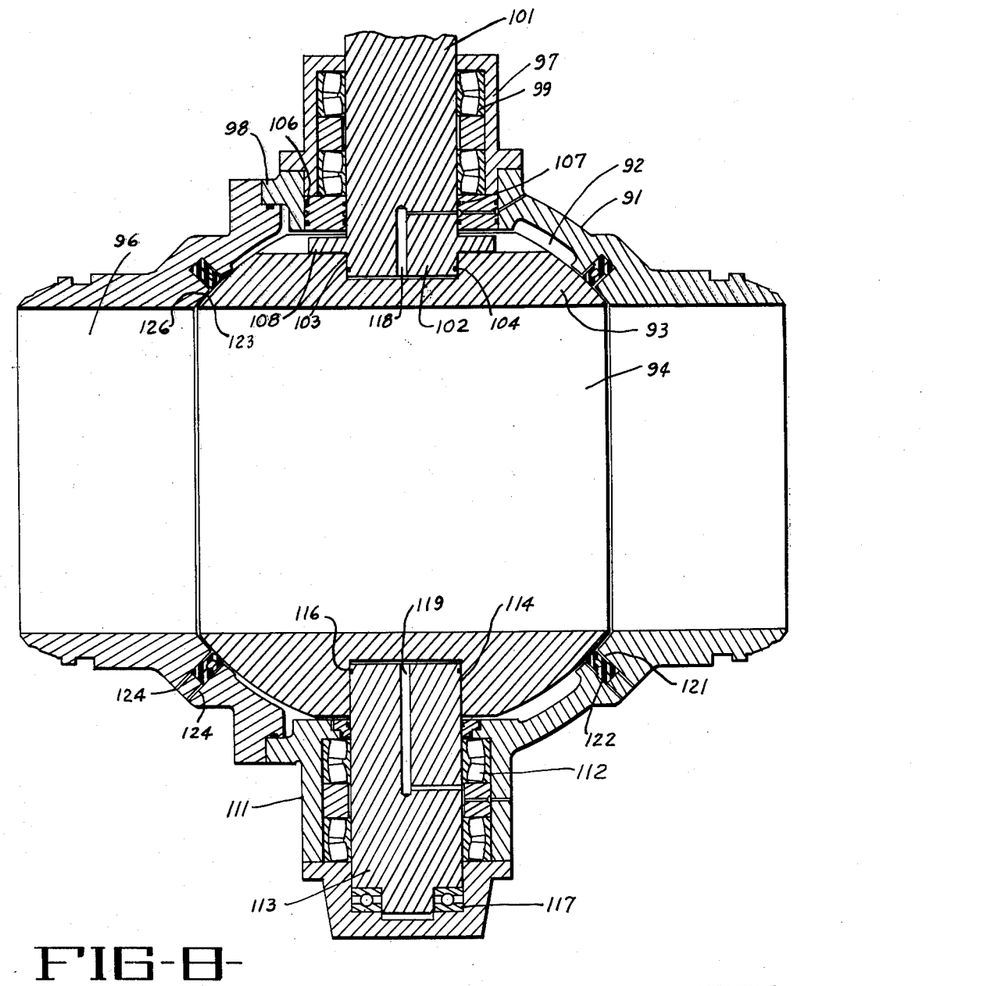
FIGURE 8 is a side elevational view in section illustrating a valve of the ball type incorporating the present invention.

FIGURE 8 shows a valve of the ball type which incorporates the invention. In this instance the body 91 has an inner space 92 for accommodating the ball 93. The port 94 extending through the ball registers with the body passages 96 for open position. Preferably trunnion means is provided for the ends of the ball, for ease of rotation, and to take the thrust of line pressure for closed valve position. Thus a bearing housing 97 is mounted upon the end body plate 98, and serves to carry the bearing assembly 99. The operating stem 101 is carried by the bearing assembly 99, and has its inner end portion 102 inserted within a bore 103 in the ball. Suitable sealing means 104, such as a seal ring of the O-ring type, forms a seal between the stem 104 and the ball. Also the housing 97 is shown sealed with respect to the bonnet plate 98 and with respect to the stem by suitable means 106 and 107 of the resilient O-ring type. A flange 108 on the inner end of the stem 101 is regularly attached to the ball by suitable means such as screws or studs (not shown).

With the other end of the ball there is a bonnet housing 111 which carries the bearing assembly 112. The stem 113 is mounted within the bearing assembly 112 and has its inner end fitted within the bore 114 formed in the ball. This inner end is sealed with respect to the ball by suitable means such as the seal ring 116 of the O-ring type. Stem 113 is also provided with an end thrust bearing assembly 117. The ducts 118 and 119 in the stems 101 and 113 connect the spaces at the inner ends of these stems with the atmosphere, thus causing the ball to balance with respect to line pressure in so far as its end fluid pressure areas are concerned.

The two sides of the body are provided with machined recesses 121 which serve to accommodate the resilient seal rings 122. These seal rings are constructed and installed in substantially the same manner as the seal rings previously described. The resilient seal rings have fluid sealing engagement with the spherical valve working surface 123 of the valve ball. As in the other embodiments, the bottoms of the recesses are in communication with the atmosphere through one or more ducts 124. In the machining and the assembly of this valve a small clearance is maintained between the valve working surface 123 and the adjacent spherical surfaces 126 formed on the body. Thus under all operating conditions, the thrust of line pressure upon the ball is taken by the stems 101 and 113, and their associated bearing assemblies. However here again fluid type seals are maintained upon both the upstream and downstream sides of the ball.

As described in connection with FIGURES 2–4, the two base portions 43a and 43b have flat opposed surfaces 47a and 47b which are squeezed together when the seal ring is inserted into its accommodating recess. As illustrated in FIGURE 9, instead of employing the flat surfaces 47a and 47b, a rib 127a is provided on the base portion 47a, and is proportioned to interfit the groove 127b in the base portion 43b. It will be evident that when this construction is installed in an accommodating recess in the manner shown in FIGURE 3, the rib 127a will interlock with the accommodating groove 127b, thus preventing one base portion from being displaced with respect to the other.

Figures 10, 11:
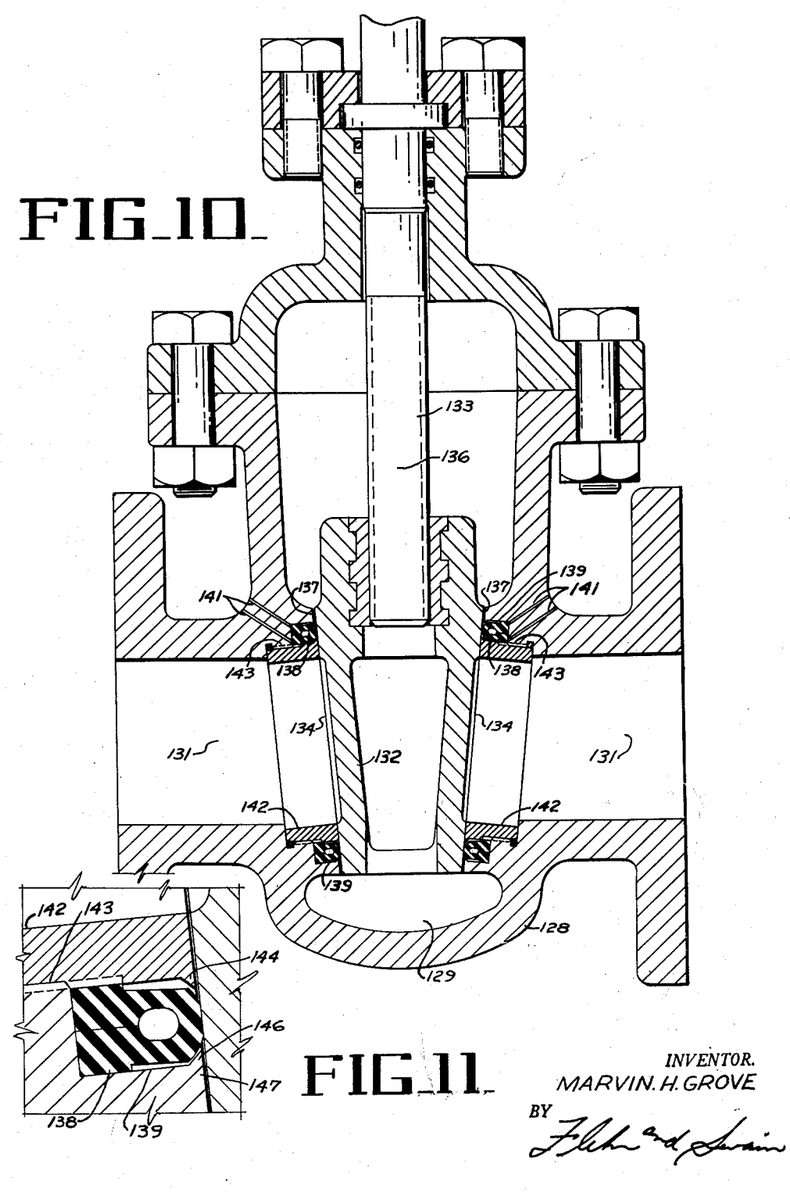
FIGURE 10 is a cross-sectional view in side elevation illustrating a gate valve of the wedge type provided with sealing means in accordance with the present invention and which can be used for the higher operating pressures, as for example, pressures in excess of 300 p.s.i.
FIGURE 11 is an enlarged detail in section showing the seal ring and its mounting means of FIGURE 10.

The valve of FIGURE 10 is of the wedge gate type, as distinguished from the slab type gate shown in FIGURE 5. Thus the valve body 128 has an inner space 129 between the fluid passages 131, which accommodates the tapered valve gate 132. This gate is attached to the inner end of the operating stem 133. The opposed faces 134 of the gate are coincident with planes inclined at equal angles to the central axis 136. Also the gate surfaces 134 operate parallel to the annular body surfaces 137. Seal rings 138 are constructed substantially as shown in FIGURE 5, and are disposed within the body recess 139. These recesses are connected to the atmosphere through ducts 141. The inner defining surface of each recess 139 is formed by the outer peripheral portion of an associated seat ring 142, which is fixed within the body as by means of a threaded connection 143.

As illustrated particularly in enlarged FIGURE 11, the body and the seat ring 142 are formed to provide annular lips 144 and 146, which in general overlie the adjacent portions of the seal rings 138. In the proportioning of the seat rings 142, it is desirable for opposed end faces 147 to engage and carry the thrust of the gate. In other words, the proportioning is such that there is a slight clearance between the body surfaces 137 and the valve working surfaces 134 of the gate.

In general, the seal ring arrangement of FIGURES 10 and 11 operates in the same manner as the previously described embodiments. However, the lips 144 and 146 exert a mechanical retaining effect upon the seal rings whereby dislodgement of the seal rings is prevented for higher operating pressures, as, for example, pressures ranging from 300 to 1000 p.s.i., or higher.

Figure 12:
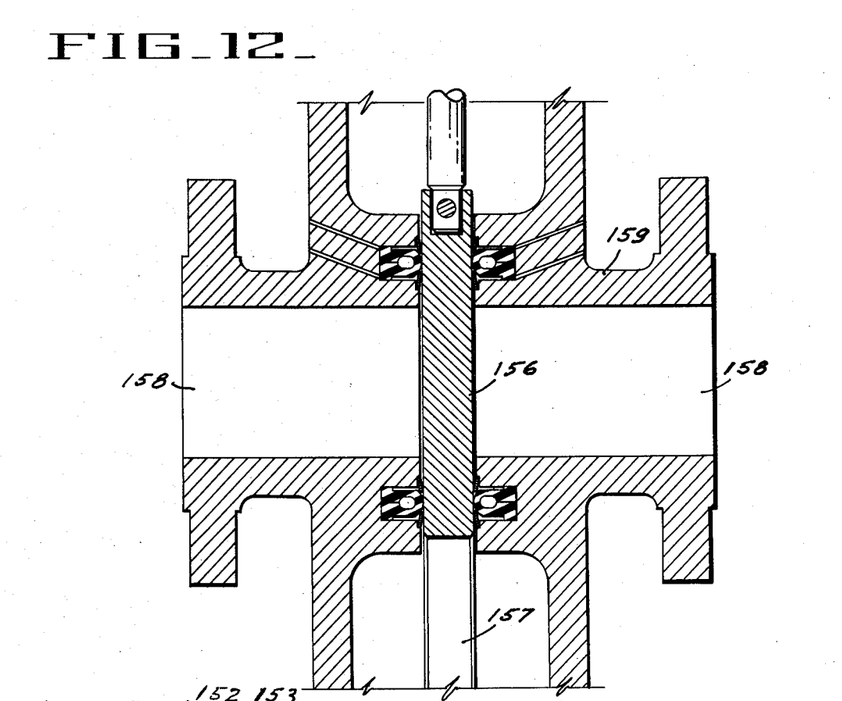
FIGURE 12 is a cross-sectional view in side elevation showing a gate valve of the full port type provided with my sealing means.
Figure 13:
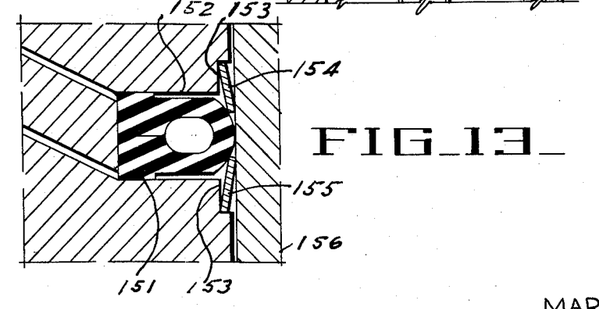
FIGURE 13 is an enlarged detail in section showing the seal ring of FIGURE 11 and its associated mounting means and other parts.

The valve shown in FIGURES 12 and 13 is somewhat similar to FIGURES 5 and 5A. However, the resilient seal ends are associated with annulus of the Belleville type. Thus, the seal rings 151 are like the seal rings 67 of FIGURE 5A, and are fitted into the recesses or grooves 152. Additional recesses 153 serve to accommodate the spring metal washers 154 and 155 of the Belleville type. Normally the washers overlie adjacent portions of the seal rings 151 (see FIGURE 13), and within the permissible movement of the gate 156 laterally of its plane, the washers contact the gate and have a scraping action when the gate is moved between open and closed positions. The seal rings contact and seal upon the sides of the gate in the areas between the adjacent peripheries of washers 154 and 155.

The gate 156 in FIGURE 12 is of the "full port" type, being provided with a port 157 which registers with the passages 158 of the valve body 159.

The valve shown in FIGURES 12 and 13 operates as follows. The sealing action is the same as previously described. Washers 154 and 155 have a scraping action on the sides of the gate when the gate is moved between open and closed positions, thus removing foreign material and insuring clean surfaces for sealing contact. The washers also function somewhat like the lips 144 and 146 of FIGURES 10 and 11, in that they tend to hold the seal ring against dislodgment.

It will be evident from the foregoing that my invention can be incorporated in a variety of valve constructions and that the sealing means is of such a character that it has wide accommodation, including accommodation for inaccuracies in machining, methods used for valve surface finishing, variations in tolerances and clearances and slight misalignments which may occur during assembly. Line pressure is utilized, by virtue of the flexible character of the seal ring walls to secure fluid tight engagement with the cooperating metal valve working surface, without however causing such pressure to be of such magnitude as to make operation difficult under applied pressure conditions. Within the pressure range for which the valve is constructed the seal rings are not subject to damage due to excessive wear, pinching, or extrusion.

In general, valves incorporating my invention are relatively inexpensive to manufacture due to the features mentioned above and also to the absence of special mounting rings or other retaining devices for holding the seal rings in place. As previously described it is only necessary to provide simple recesses for accommodating the seal rings, and dislodgement of the seal rings under operating conditions is provided by causing line pressure to develop a pressure differential tending to urge the seal rings into their recesses.

I claim:

1. In a valve construction, a valve body member having a seat, a valve closure member cooperating with said seat in its closed position, said members being spaced apart with a slight gap in the closed position of said valve, one of said members being provided with a groove having parallel, unrecessed side walls and a bottom wall, the other of said members extending across the mouth of said groove in the closed position of said valve member, a sealing means of resilient material disposed in said groove, said sealing means having a base of sufficient width greater than the distance between said side walls of the groove as to require deformation of said sealing means into tight contact with said side walls, said sealing means formed with an annular arched wall portion disposed projecting out of said groove, said arched wall portion enclosing a hollow space within the same, at least a substantial portion of said hollow space being located within the confines of said groove, the sides of said groove being farther apart than the width of said arched wall portion in unstressed condition of said sealing means, said arched wall portion being free to flex within the groove and disposed to contact and form a fluid tight seal with respect to said other member, said arched wall portion surrounding said hollow space accommodating variations in width of said gap in response to applied fluid pressure differentials in said valve.

2. A valve as in claim 1 in which the valve closure member is in the form of a disk that is rotated about an axis extending laterally of the passage.

3. A valve as in claim 1 in which the valve closure member is in the form of a gate that is moved in the direction of its general plane between open and closed positions.

4. A valve as in claim 1 in which the valve closure member is in the form of a ported plug that is fitted within a bore formed in the body member and which is rotated between open and closed positions.

5. A valve as in claim 1 in which the valve closure member is in the form of a ported ball that is rotated between open and closed positions.

6. A valve as in claim 1 in which the bottom of said groove is vented whereby internal fluid line pressure tends to urge the sealing means against the bottom of said groove.

7. A valve seal as in claim 1, in which the hollow of said sealing means is filled with pressure transmitting fluid-like material that is substantially incompressible.

8. A valve construction as in claim 1 in which the groove is formed to provide at least one annular lip extending into the mouth of the groove and serving to aid in retaining the sealing means against dislodgement from the groove.

9. A valve construction as in claim 1 in which at least one washer of the Belleville type is carried by the grooved valve member and is disposed with a margin of the same normally overlying a part of said arched wall portion, said washer having engagement with said other valve member for closed position of the valve.

References Cited in the file of this patent

UNITED STATES PATENTS

| Re. 23,613 | Danks | Jan. 13, 1953 |
|---|---|---|
| 1,318,001 | Upson | Oct. 7, 1919 |
| 2,401,377 | Smith | June 4, 1946 |
| 2,722,402 | Crookston | Nov. 1, 1955 |
| 2,810,542 | Bryant | Oct. 22, 1957 |
| 2,882,009 | Bryant | Apr. 14, 1959 |
| 2,933,285 | Tucker | Apr. 19, 1960 |
| 3,027,909 | Swain | Apr. 3, 1962 |
| 3,030,066 | Swain | Apr. 17, 1962 |

FOREIGN PATENTS

| 139,945 | Australia | 1949 |